United States Patent
Wehmann et al.

(10) Patent No.: US 11,686,389 B2
(45) Date of Patent: Jun. 27, 2023

(54) ROTARY SEAL ARRANGEMENT AND ROTARY SEAL WITH RECIRCULATION FUNCTION

(71) Applicant: Trelleborg Sealing Solutions Germany GmbH, Stuttgart (DE)

(72) Inventors: Christoph Wehmann, Stuttgart (DE); Martin Franz, Wannweil (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 444 days.

(21) Appl. No.: 16/686,188

(22) Filed: Nov. 17, 2019

(65) Prior Publication Data

US 2020/0080643 A1 Mar. 12, 2020

Related U.S. Application Data

(63) Continuation of application No. PCT/EP2018/063092, filed on May 18, 2018.

(30) Foreign Application Priority Data

May 19, 2017 (DE) ...................... 10 2017 208 574.6

(51) Int. Cl.
*F16J 15/16* (2006.01)
*F16J 15/3208* (2016.01)
(Continued)

(52) U.S. Cl.
CPC ......... *F16J 15/164* (2013.01); *F16J 15/3208* (2013.01); *F16J 15/3236* (2013.01); *F16J 15/3244* (2013.01); *F16J 15/344* (2013.01)

(58) Field of Classification Search
CPC .... F16J 15/164; F16J 15/3208; F16J 15/3236; F16J 15/3244; F16J 15/344
See application file for complete search history.

(56) References Cited

U.S. PATENT DOCUMENTS 3,515,395 A * 6/1970 Weinand .............. F16J 15/3244
277/559
3,586,342 A * 6/1971 Staab ................... F16J 15/3244
277/559
(Continued)

FOREIGN PATENT DOCUMENTS

DE 19821146 A1 * 11/1999 ............. F16J 15/324
DE 10 2015 226 705 A1 6/2017
(Continued)

*Primary Examiner* — Eugene G Byrd
*Assistant Examiner* — L. Susmitha Koneru
(74) *Attorney, Agent, or Firm* — Orbit IP

(57) ABSTRACT

A rotary seal assembly has a first and second machine element spaced apart forming a sealing gap. The first machine element has a seal-holding structure and the second machine element a sealing surface. A rotary seal is held on the seal-holding structure of the first machine element which has a sealing lip, the front side of which faces the sealing surface and at least partially abuts the sealing surface of the second machine element, pretensioned in a dynamically sealing manner. The sealing lip has pockets on its rear side or on its end face facing the high pressure side. The sealing lip on its rear side, in the case of rearwardly arranged pockets, is tensioned against the sealing surface by an elastically deformable pretensioning ring, and is tensioned in the case of the front side pockets by an elastic resilience inherent in the material of the rotary seal.

16 Claims, 17 Drawing Sheets

(51) Int. Cl.
*F16J 15/3236* (2016.01)
*F16J 15/3244* (2016.01)
*F16J 15/34* (2006.01)

(56) References Cited

U.S. PATENT DOCUMENTS

| | | | | |
|---|---|---|---|---|
| 3,785,660 | A | * | 1/1974 | Bush .................... F16J 15/3244 |
| | | | | 277/560 |
| 3,861,691 | A | | 1/1975 | Wheeler |
| 3,923,315 | A | * | 12/1975 | Hadaway ............. F16J 15/3244 |
| | | | | 277/559 |
| 4,484,752 | A | * | 11/1984 | Bentley ................. F16J 15/164 |
| | | | | 277/377 |
| 4,750,747 | A | | 6/1988 | Holzer |
| 5,722,665 | A | * | 3/1998 | Sedy .................... F16J 15/3412 |
| | | | | 277/400 |
| 6,561,515 | B1 | * | 5/2003 | Bjornson ............. F16J 15/3488 |
| | | | | 277/358 |
| 6,779,798 | B1 | | 8/2004 | Fougerolle |
| 10,267,421 | B2 | * | 4/2019 | Ohya .................... F16J 15/3412 |
| 2008/0309024 | A1 | | 12/2008 | Vom Schemm |
| 2010/0201074 | A1 | * | 8/2010 | Haynes ................. F16J 15/441 |
| | | | | 277/361 |
| 2014/0312571 | A1 | * | 10/2014 | Kurth ................... F16J 15/3244 |
| | | | | 277/559 |
| 2016/0047474 | A1 | * | 2/2016 | Toth ...................... F16J 15/3244 |
| | | | | 277/559 |
| 2017/0009889 | A1 | * | 1/2017 | Seki ....................... F16J 15/164 |
| 2018/0266563 | A1 | * | 9/2018 | Kurth ................... F16J 15/3244 |
| 2019/0277403 | A1 | * | 9/2019 | Sakano ................ F16J 15/3204 |

FOREIGN PATENT DOCUMENTS

| | | | | |
|---|---|---|---|---|
| DE | 102016124457 A1 | * | 6/2018 | ........... F16J 15/3228 |
| EP | 0 355 503 A2 | | 2/1990 | |
| ES | 291796 U | | 6/1986 | |
| GB | 1 475 333 A | | 6/1977 | |
| JP | H10 122376 A | | 5/1998 | |
| JP | H11 351405 A | | 12/1999 | |

\* cited by examiner

ROTARY SEAL ARRANGEMENT AND ROTARY SEAL WITH RECIRCULATION FUNCTION

CROSS-REFERENCE TO RELATED APPLICATIONS

This continuation application claims priority to PCT/EP2018/063092 filed on May 18, 2018 which has published as WO 2018/211073 A1 and also the German application number 10 2017 208 574.6 filed on May 19, 2017, the entire contents of which are fully incorporated herein with these references.

DESCRIPTION

Field of the Invention

The invention relates to a rotary seal arrangement and a rotary seal with recirculation function. The rotary seal arrangement comprises a first and a second machine element, which are spaced apart from one another while forming a sealing gap and are arranged so as to be movable relative to one another about an axis of rotation. The first machine element has a seal-holding structure and the second machine element has a sealing surface. A rotary seal serves to seal a high-pressure side H of the seal gap pressurizable with a fluid against a low-pressure side N of the seal gap. The rotary seal is arranged held on the seal-holding structure of the first machine element and comprises a sealing lip, which rests with its front side facing the sealing surface abutting the sealing surface of the second machine element in a dynamically sealing manner. The sealing lip thus extends at least in sections parallel or substantially parallel to the sealing surface.

Background of the Invention

Such rotary seals represent as dynamic sealing systems essential construction elements in mechanical engineering and in vehicle construction. The rotary seals are used in practice as radial or axial shaft sealing rings. Such rotary seals are in practice exposed to continually increasing operating pressures, temperatures and sliding speeds, not least due to the technical advancement of the units. The failure of rotary seals results in an undesirable leakage of the fluid to be sealed, which may have devastating consequences, in particular, in critical applications. The rotary seal elements must therefore meet increasingly higher demands with respect to their sealing capacity and should still also have an improved service life.

A reduction in the service life of the seal elements caused by friction is counteracted in practice primarily by optimized lubrication in the area of the sealing section or the sealing edge of the seal element abutting the sealing surface, by the use of material pairings with preferably minimal sliding friction, as well as an optimized heat dissipation in the area of the sealing zone. For a recirculation of fluid, the sealing lips used in practice may have so-called tribo structures on their front side which abuts the sealing surface. These tribo structures are inevitably subject to wear in operational use of the rotary seal arrangement in operational use, so that the recirculation function of the rotary seal often may not be guaranteed even after a short period of use of the rotary seal. The life of the rotary seal can thereby be shortened unnecessarily.

It is therefore the object of the invention to provide a rotary seal arrangement in which the fluid recirculation function is less wear-dependent.

SUMMARY OF THE INVENTION

The task relating to the rotary seal arrangement is achieved by a seal arrangement having the features specified in the independent claims.

In the case of the rotary seal arrangement according to the invention, the sealing lip of the rotary seal comprises pockets on its rear side pointing away from the sealing surface of the second machine element or on its front side. In the present case, a pocket is understood to mean a recess or a depression of the sealing lip. In the case of the pockets arranged on the rear side of the sealing lip, in each case a local reduction in thickness, i.e. a material weakening, of the sealing lip results in the region of the pockets. In a frontally arranged pocket on the sealing lip, this is spaced from the rear side and from the front side of the sealing lip. In this case, the pockets therefore have an opening facing (pointed at) the high-pressure side or the low-pressure side of the sealing gap or the sealing arrangement.

The pockets of the sealing lip are spaced from each other in the circumferential direction of the rotary seal arranged on the sealing lip. Thus, in each case a non-material-weakened circumferential segment of the sealing lip is arranged interposed between the pockets in the circumferential direction of the rotary seal or the sealing lip.

In the embodiment of the rotary seal with rear-side pockets, the sealing lip of the rotary seal is tensioned by an elastically, preferably rubber-elastic, deformable pretensioning ring against the sealing surface of the second machine element. If the rotary seal is designed as a radial shaft sealing ring, then the sealing lip is pretensioned by the pretensioning ring in a radial direction to the movement axis against the sealing surface. In the case of a rotary seal designed as an axial shaft sealing ring, the sealing lip is pretensioned accordingly by the pretensioning ring in the axial direction against the sealing surface of the second machine element. In this case, the pretensioning ring is preferably formed separately from the rotary seal.

The pretensioning ring may be formed according to the invention, in particular in the form of a worm spring or a rubber or elastomeric ring. The rubber or elastomeric ring may have a circular-cylindrical, an elliptical or oval cross-sectional shape or a free-form cross-section. The pretensioning ring may be supported on the first machine element or an attachment of the first machine element. Also, the pretensioning ring, may be pretensioned by one or more worm springs, in addition, in the direction of the sealing surface of the second machine part.

The pockets of the sealing lip in the circumferential direction of the rotary seal are each laterally (at least to one side) bounded by a side wall portion of the sealing lip, which is arranged at least partially at an acute angle α, β in the direction of the high pressure side H obliquely relative to the circumferential direction, such that the sealing lip abuts the sealing surface of the second machine element at the sealing surface in the circumferential direction with a contact pressure profile corresponding to the surface structuring of the rear side of the sealing lip, by which a relative movement of the two machine parts about the axis of rotation effects a recirculation of fluid directed toward the high pressure side, which has passed between the sealing lip and the sealing surface.

In the case of the rotary seal arrangement according to the invention, the sealing lip structures which are essential for the recirculation capacity of the rotary seal are therefore not arranged on the dynamically sealing front side of the sealing lip, which is subject to thermal or mechanical wear during operational use. Instead, in the case of the rotary seal according to the invention, these structures are arranged in regions of the sealing lip which are arranged at a distance from the sealing surface of the second machine element during the operational use of the rotary seal arrangement. These sealing lip structures are thus without a direct mechanical contact with the dynamic sealing surface during operation of the rotary seal arrangement and thus are not subject to immediate frictional wear. Wear-prone tribo structures on the front side of the sealing lip facing the sealing surface can thereby be completely unnecessary.

Overall, this can ensure an efficient recirculation of fluid over a longer period of use of the rotary seal arrangement or for service operations with higher relative circumferential velocities of the two machine elements or at higher operating pressures than is possible with rotary seal arrangements with conventional tribo structures on the front side of the sealing lip facing the sealing surface. In addition, due to the recirculation principle according to the invention, a lower leakage, in particular for longer running times of the rotary sealing arrangements, can be realized than is possible with previously available rotary seals. Also, a direct or indirect cooling of the sealing lip in the region of its contact surface area with the sealing surface can be by the fluid flow caused to the high pressure side, and thereby also a thermal overstressing of the sealing lip and the fluid can be counteracted. When using an oil fluid, an undesirable formation of carbon can also be counteracted.

In the case of the recesses or pockets arranged on the rear side of the sealing lip of the rotary seal, the pretensioning ring according to the invention abuts circumferentially the rear side of the sealing lip. The pretensioning ring in this case activates the recirculation mechanism by generating a spatial contact pressure distribution of the sealing lip on the dynamic sealing surface predetermined by the surface structuring of the rear side of the sealing lip, i.e. the recirculation structures. Due to the elastic pretension of the sealing lip against the sealing surface, a larger pre-compression of the sealing lip against the sealing surface is generated in the area between the recesses or pockets, i.e. in the non-material-weakened peripheral portions of the sealing lip of the rotary seal, than in the sealing lip sections with the indentations or pockets. The effect can be additionally reinforced by an additional pressure activation of the rotary seal or its sealing lip. This difference in the pre-pressing leads to the desired contact pressure distribution of the sealing lip on the sealing surface, which has the same effect as an objective inclined wall, which is moved by a fluid or is subject to fluid flow. Since in the circumferential direction of the rotary seal a higher compression pressure of the pretensioning ring against the sealing lip and thus the sealing lip against the sealing surface is present between the pockets, the fluid film is necessarily thinner here than in those peripheral portions of the sealing lip, which are weakened by the indentations or pockets. The so-called leakage flow $\dot{V}$ of the fluid in the area of the contact surface area of the sealing lip and the sealing surface is known to increase cubically with the lubricant film thickness, i.e., $\dot{V} \sim h^3$. In that regard, the leakage flow $\dot{V}$ of the fluid between the sealing lip and the sealing surface of the second machine element will take place mainly in the region of the pockets. When a fluid particle flows into the sealing gap under a pocket during a rotational movement of the two machine elements relative to one another, i.e., e.g. during rotation of the second machine element embodied as a shaft, the fluid particle will meet the contact pressure flank of the section formed by the side wall which runs obliquely to the circumferential direction of the rotary seal or to the direction of rotation of the machine elements, with pressure steeply increasing in the circumferential direction of the rotary seal, and thus meet the "contact pressure wall" between a contact pressure zone with low contact pressure and a contact pressure zone with high contact pressure, and be transported by this back towards the high pressure side of the rotary seal arrangement. If the rear pockets of the sealing lip each have only one side wall inclined obliquely to the circumferential direction at an acute angle, which laterally delimit the pockets in the same direction, the recirculation function of the rotary seal can be seen to depend on the direction of rotation. In the case of a rotary seal designed as a radial shaft sealing ring, the rotary seal has an axial recirculation direction directed to the high-pressure side H. In the case of a rotary seal designed as an axial shaft sealing ring, the recirculation direction—in relation to the axis of movement of the two machine elements—is directed radially in the direction of the high-pressure side H.

In the case of pockets arranged on the front side of the sealing lips arranged on the pockets, the sealing lip sealingly abuts the (dynamic) sealing surface, pretensioned by an elastic resilience inherent in the material of the rotary seal or the sealing lip. Also in this embodiment, the contact pressure of the sealing lip against the sealing surface in the region of their (weakened) peripheral portions provided with the pockets, is smaller than in the non-material-weakened sealing lip portions. A (rubber) elastically deformable pretensioning ring formed separately from the rotational sealing element can thus be completely unnecessary in this embodiment. The sealing lip can thereby be supported on the first machine element or on an attachment of the first machine element and abut this, in particular via a sealing edge, in a directly statically sealing manner. A particularly simple structure and a simplified assembly of the rotary seal arrangement can thereby be achieved.

According to a preferred embodiment of the invention, the rotary seal or its sealing lip is pressure-activated. During operation of the rotary seal arrangement, the sealing lip is thus additionally tensioned or pressed against the sealing lip by a working or fluid pressure prevailing on the high-pressure side, proportional to the operating pressure. In the pocketed sealing lip areas, a smaller contact pressure of the sealing lip against the sealing surface is formed by the operating pressure P than in those sealing lip segments which are not provided with a pocket. When pressure is applied to the rotary seal with the operating pressure prevailing on the high-pressure side, a deformation of pockets arranged on the front side/in the sealing lip a compression, i.e. deformation, of the rotary seal is required. The rotary seal is subsequently deformed in the direction of the sealing surface and consequently pressed against the sealing surface in proportion to the operating pressure. In this case, this effect is greater in the non-material-weakened circumferential segments of the sealing lip, than in the areas provided with pockets and thus in the material-weakened sealing lip areas. In the case of a rotary seal designed as a radial shaft sealing ring, it is compressed in the axial direction, preferably with support on a low pressure side groove flank of a seal retaining structure of the first machine part formed as a retaining groove, and thus deflected in the radial direction and thus pressed against the sealing surface of the second machine part in a pressure-proportional manner to the operating pressure P. If the rotary seal is designed in the form of an axial shaft sealing ring, the rotary seal is compressed in the radial direction when pressure is applied and as a result deflects in the axial direction and thus is pressed against the sealing surface of the second machine part.

The pockets arranged on the rear or end faces on the sealing lip can advantageously extend over a majority of the longitudinal extension of the sealing lip. This is advantageous for the recirculation effect of the rotary seal, especially in a pressure-activatable or pressure-activated rotary seal.

If the rotary seal is provided with a pretensioning ring, the pretensioning ring can be pressure-activated according to the invention.

According to the invention, the recesses or pockets of the sealing lip in the circumferential direction can in each case be mutually laterally defined by side wall portions of the sealing lip, which are arranged at least in sections, preferably in total, relative to the circumferential direction of the sealing lip obliquely at an acute angle $\alpha$, $\beta$ and each diverge in the direction to the high pressure side of the seal assembly. Thereby, the recirculation function of the rotary seal can be realized independently of a respective rotational direction of the two machine elements. The pockets thus taper in the direction of the low-pressure side in their measured width in the circumferential direction.

In other words, the side walls of the pockets are arranged to extend divergently in the direction of the high-pressure side. Correspondingly, a (skew) angle $\alpha$, $\beta$, which functionally corresponds to the "wall-like" contact pressure increase of the sealing lip against the sealing surface, also occurs here, which is decisive for the recirculation function of the rotary seal. In particular, the pockets can, according to the invention, comprise a rectangular or even an elliptical/oval cross-section.

In the case of the rotary seal with pockets arranged on the rear side, the contact pressure of the sealing lip in the flush regions of the front side of the sealing lip which correspond to the side wall sections of the pockets can be further increased by the sealing lip on its rear side in the region of the side wall sections comprising, preferably web-like or rib-like, elevations or beads, by which the side wall portions of the pockets pointing in a direction away from the back of the sealing lip or the sealing surface direction over the (surface) contour of the back or the non-material-weakened sealing lip segments of the sealing lip are raised. In other words, the side wall sections of the depressions are defined or formed in part by side flanks of the elevations or beads in this design.

The indentations or pockets arranged on the rear side of the sealing lip of the rotary seal may, according to a development of the invention, be fluidly connected to one another via recesses or channels of the sealing lip which are preferably groove-shaped or notched. These channels are thus also arranged on/in the rear side of the sealing lip. In the case of a radially sealing rotary seal, the sealing lip is located with its front side in the surface areas aligned to the recesses in the radial direction with a smaller contact pressure compared to the non-material-weakened (thickness-weakened) areas of the sealing lip, on the mating surface (sealing surface) of the second machine element. In an axially sealing abutment of the sealing lip of the rotary seal on the sealing surface, these areas are aligned accordingly in the axial direction with the recesses. As a result, the lubricating behavior in the dynamic contact surface area of the sealing lip and the sealing surface of the second machine element can be further improved.

The rotary seal arrangement according to the invention may have two or more rotary seals. These may have a recirculation function opposing each other or else a recirculation function for the fluid in the same direction in the sense of a tandem seal. In the former case, even with an alternating pressurization of the high-pressure side and the low-pressure side with an operating pressure P, a reliable return of the fluid to the respective pressurized side can be achieved.

It should also be noted that the rotary seal as well as the possible pretensioning ring or additional attachments of the rotary seal arrangement can be arranged in a cartridge known per se. Thereby, the provision of the rotary seal and the assembly of the rotary seal arrangement can be further simplified, if necessary.

As already explained above, the rotary seal, relative to the axis of rotation, can be designed to be sealing in the axial or in the radial direction. In the former case, the rotary seal is designed as an axial shaft sealing ring and in the latter case as a radial shaft sealing ring. If the rotary seal is designed as a radial shaft sealing ring, it is possible to carry out dynamically internal sealing or external sealing in the radial direction.

The sealing lip of the rotary seal can, according to the invention, have a sealing edge, which rests on the sealing surface of the second machine element in a dynamically sealing manner.

The rotary seal may consist at least partially or completely of a rubber-elastically or viscoelastically deformable material, in particular a thermoplastic, such as polytetrafluoroethylene or a so-called PTFE compound.

Further advantages of the invention will become apparent from the description and the drawings. Likewise, according to the invention, the above-mentioned features and those which are to be explained below can each be used individually for themselves or for a plurality of combinations of any kind. The embodiments shown and described are not to be understood as an exhaustive enumeration, but rather have exemplary character for the description of the invention.

DETAILED DESCRIPTION OF THE PREFERRED EMBODIMENTS

Figure 1:
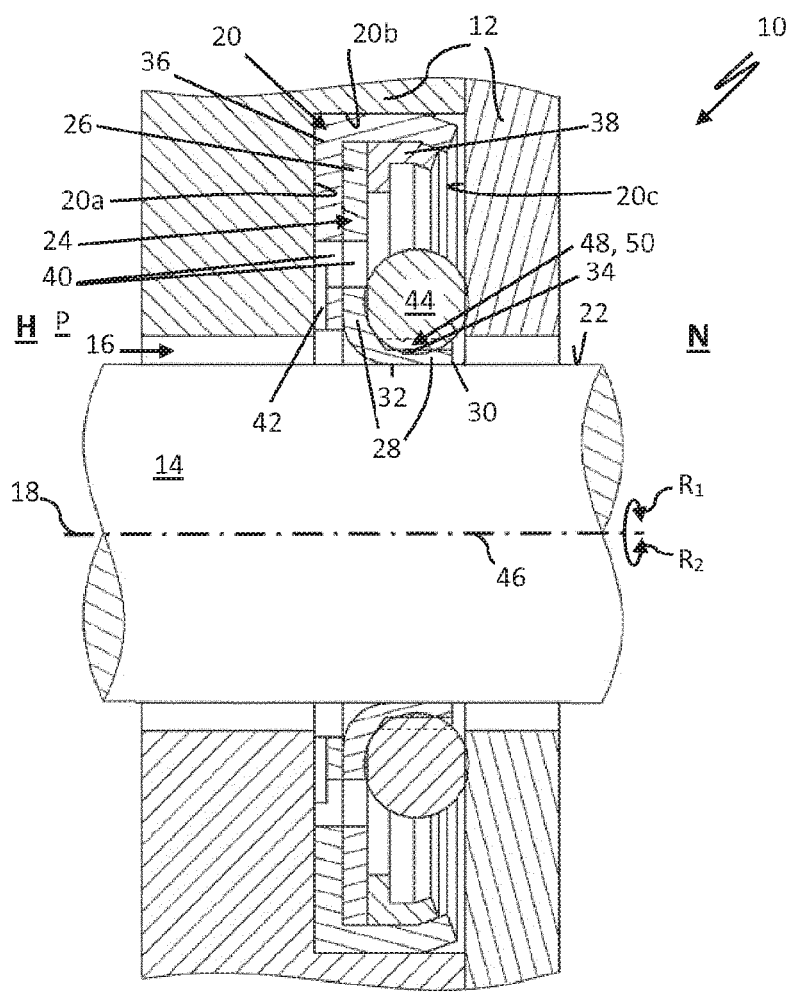
FIG. 1 shows a rotary seal arrangement having a first and a second machine element, which are sealed by a rotary seal against each other, wherein the rotary seal has a sealing lip, which extends at least partially parallel or substantially parallel to the sealing surface of the second machine part, wherein the sealing lip on its rear side facing away from the sealing surface comprises a surface structuring, which by the pretensioned sealing abutment of the sealing lip effected by the rubber-elastically deformable pretensioning ring is reflected in the form of a contact pressure profile corresponding in the circumferential direction of the rotary seal to the surface structuring, through which in case of a rotation of the two machine elements relative to one another, a fluid recirculation toward the high pressure side H of the rotary seal arrangement is effected, and wherein the rotary seal is pressure-activated, in a partially sectioned fragmentary representation.

FIG. 1 shows a rotary seal arrangement 10 having a first and a second machine element 12, 14 spaced apart to form a sealing gap 16 and arranged rotatably about a rotational axis 18 in opposite directions of rotation $R_1$, $R_2$ relative to each other. The first machine element 12 has a seal-holding structure, here a holding groove 20 with a high-pressure side groove flank 20a, a groove bottom 20b and a low-pressure side groove flank 20c. The second machine element 14 comprises a dynamic sealing surface 22. A rotary seal 24 serves to seal a high-pressure side H of the seal gap 16 which is pressurizable with a fluid against a low-pressure side N of the seal gap. The rotary seal 24 is designed here as a so-called radial shaft seal. The rotary seal 24 may be made in one piece and comprises a holding section 26 arranged substantially radially and a sealing lip 28 with a sealing edge 30 which extends in the axial direction from the holding section 26, here in the direction of the low-pressure side N. The sealing lip 28 is arranged extending in sections parallel or substantially parallel to the sealing surface 22 of the second machine element 14. The sealing lip 28 abuts with its front side 32 the sealing surface 22 of the second machine part 14 in a dynamically sealing manner. The rear side of the sealing lip is designated 34. The rear side 34 of the sealing lip 28 thus points away from the sealing surface 22, here in a radial direction. The holding portion 26 is here held clamped by means of a support ring 36 and a clamping ring 38 in the retaining groove 20 of the first machine element 12 and thereby fixed non-rotatably on the first machine element 12. Other types of attachment such as a pinning of the holding portion are conceivable.

The support ring 36 as well as the holding portion 26 of the rotary seal 24 each have one or more through-holes 40 through which a fluidic connection of the high-pressure side H is made possible with the retaining groove 20 of the first machine element 12. If necessary, the first machine part can have a groove labeled 42 to ensure a high-pressure-sided inflow of fluid to the through-holes 40. The holding groove 20 is thereby pressurized during operation of the rotary seal arrangement 10 with an operating pressure P prevailing on the high-pressure side H. The rotary seal 24 or its sealing lip 28 is thereby pressure-activated. In other words, pressurization of the high-pressure side H with an operating pressure P leads to a pressing proportional to the operating pressure P of the sealing lip 28 against the sealing surface 22 in a radial direction—here- to the axis of rotation 18. The sealing lip 28 is pretensioned by a rubber-elastic deformable pretensioning ring 44 against the sealing surface 22. The pretensioning ring 44 abuts the rear side 34 of the sealing lip 28 circumferentially. The pretensioning ring 44 may be designed in particular as an elastomer or rubber ring or as a metal spring (worm spring). The pretensioning ring 44 and the rotary seal 24 are arranged coaxially with the axis of rotation 18 and with the center axis of the rotary seal 24 designated by 46.

Figure 2:
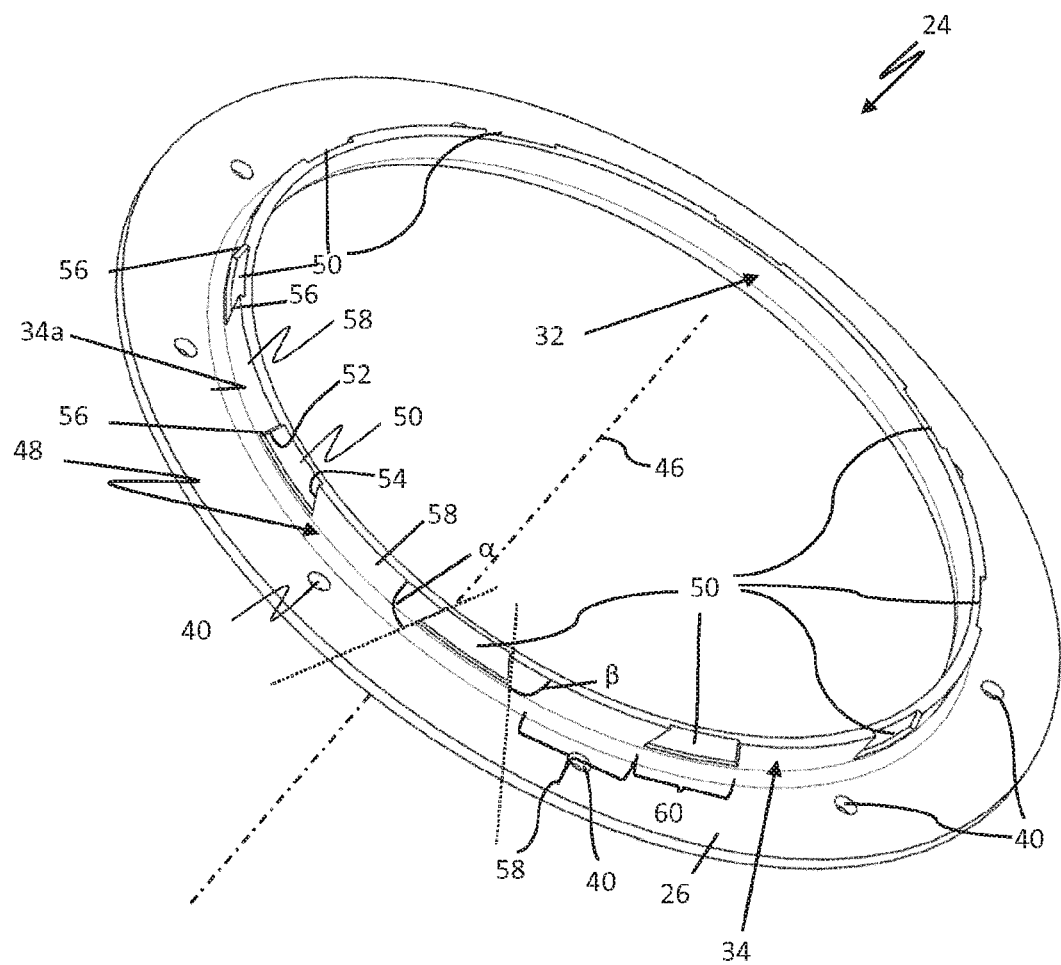
FIG. 2 shows the rotary seal of the rotary seal arrangement according to FIG. 1 in an exposed perspective view.

In FIG. 2, the rotary seal 24 of the rotary seal arrangement 10 shown in FIG. 1 is shown in an exposed perspective view.

The rotary seal 24 comprises a recirculation function for fluid, which is essentially based on a macroscopically visible surface structuring 48 of the rear side 34 of the sealing lip 28. Thus, the sealing lip 28 on its rear side 34 comprises a plurality of pockets 50. The pockets 50 are arranged spaced from each other in the circumferential direction of the rotary seal 24. According to FIG. 2, the pockets 50 in the sealing lip 28 are bounded (in the circumferential direction) on both sides in each case by a first and a second side wall section 52, 54 of the sealing lip 28. The two side wall portions 52, 54 are thus arranged opposite each other and are facing each other. It should be noted that the two side wall portions 52, 54 are each arranged obliquely relative to the circumferential direction of the sealing lip 28 at an acute angle α, β. The side wall portions 52, 54 are each connected via an edge 56 with the (surface 34a of the) rear side 34 of the sealing lip 28.

Due to the fact that the elastically deformable pretensioning ring 44 circumferentially rests outside on the sealing lip 28 in the radial direction and clamps the sealing lip against the sealing surface 22, a higher pre-pressing or pretensioning of the sealing lip 28 against the sealing surface 22 of the second machine part 14 is generated by the pretensioning ring 44 in the sealing lip areas between the pockets 50, i.e. in the circumferential segments 58 of the sealing lip 28 not material-weakened by pockets 50, than in the area of the sealing lip areas 60 provided with pockets 50 or pocket segment of the sealing lip 28. This difference in the—here radially directed—pretension or pre-compression of the sealing lip 22 leads to a desired contact pressure distribution of the sealing lip 28 against the sealing surface 22.

The sealing lip 28 thus sealingly abuts the sealing surface 22 of the second machine part 14 dynamically in the circumferential direction of the rotary seal with a contact surface pressure profile corresponding to the spatial distribution pattern of the pockets 50. Here one must, according to FIG. 3 essentially distinguish between first sealing zones 62 of the sealing surface 22 with small contact (surface) pressure and second sealing zones 64 with large contact pressure of the sealing lip 28 and sealing surface 22 compared to the first sealing zones 62.

In the first sealing zones 62, the sealing lip regions 60 provided with pockets 50, and in the second sealing zones 64 the circumferential segments 58 of the sealing lip 28 (FIG. 2) which are not provided with pockets 50, abut the sealing surface 22 in a dynamically sealing manner. The rear surface structuring 48 of the sealing lip 28 is thus formed in the form of a contact pressure profile of the sealing lip 28 and the sealing surface 20 corresponding thereto in the circumferential direction.

Due to the larger sealing surface-side contact pressure of the non-material-weakened circumferential segments 58 of the sealing lip 28 in the region of the second sealing zones 64 of the sealing surface 22, a fluid film formed between the sealing lip 28 and the sealing surface 22 is necessarily thinner here than in the sealing lip regions 60 provided with the pockets 50. Since a—here axially directed—leakage flow $\dot{V}$ of the fluid from the high pressure side H to the low pressure side N of the rotary seal arrangement 10 (FIG. 1) grows cubically with the lubricant film thickness h, $\dot{V} \sim \dot{V} \sim h^3$, the leakage flow $\dot{V}$ will take place mainly in the sealing lip areas 60 of the sealing lip 28 and the sealing surface 22 of the second machine element 14, as shown in FIG. 3 and the partial detail magnification of FIG. 4 of the region designated A in FIG. 3.

Figure 4:
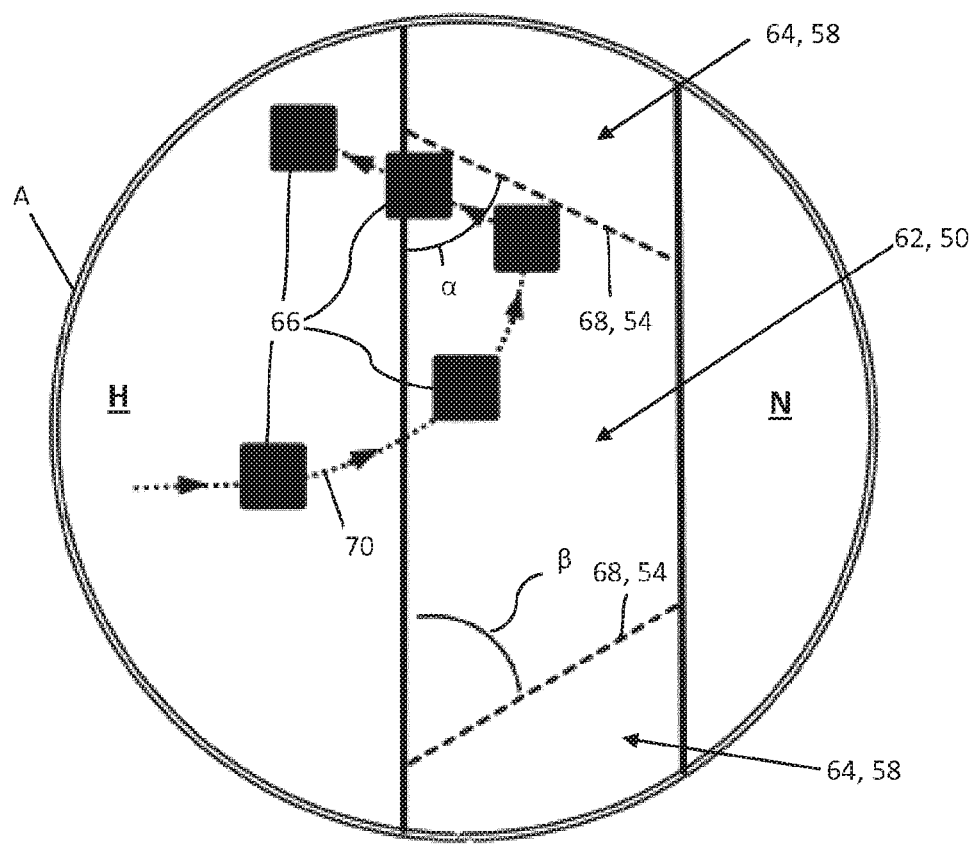
FIG. 4 shows a detailed representation of the detail A in FIG. 3 with a schematic representation of the fluid recirculation function of the rotary seal.

If a fluid particle designated in FIG. 4 with 66 flows, for example, with rotating second machine element 14 axially from the high pressure side H in the direction of the low pressure side N into the sealing gap 16 between a sealing lip region 60 having a pocket 50 and the sealing surface 22, then the fluid particle 66 will flow to the line-shaped and functionally considered wall-like steep contact pressure edge 68, which corresponds to one of the oblique side wall portions 52, 54 of the pocket 50 of the sealing lip 28, and is thereby conducted back to the high pressure side H. In FIG. 4, this recirculation principle is very schematically illustrated. The curved path line 70 of the fluid particle 66 results from the superimposition of pressure flow (oil is under pressure) and drag flow, i.e. the rotating machine element 14 entrains the fluid in the respective rotational direction $R_1$, $R_2$ or in the circumferential direction.

The angles α, β of the sidewall portions relative to the circumferential direction, the number of pockets 50, and the area ratio of the sealing lip regions 60 provided with pockets 50 to non-material-weakened lip segments 58 are basic parameters that determine the effectiveness of the fluid's return.

Figure 3:
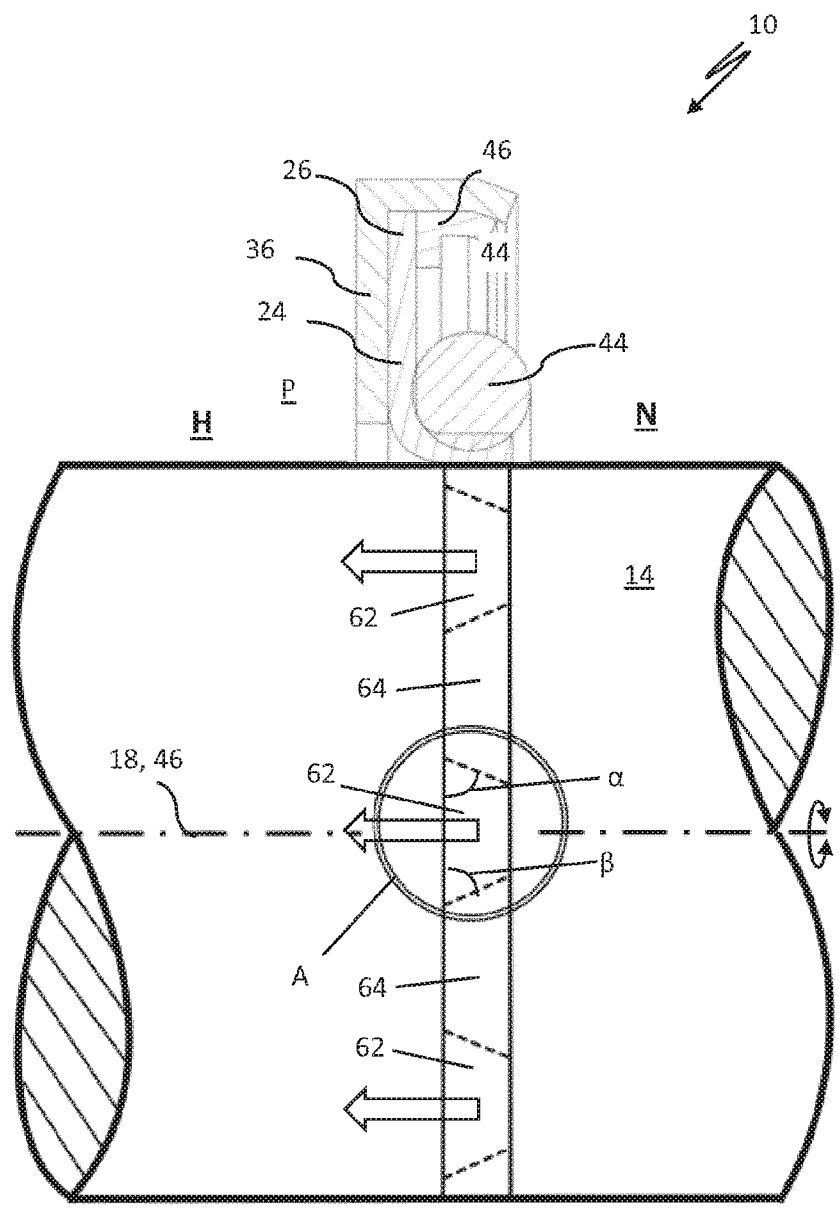
FIG. 3 shows the rotary seal arrangement of FIG. 1 in a fragmentary view with schematically given contact pressure profile of the sealing lip and the sealing surface.
Figure 5:
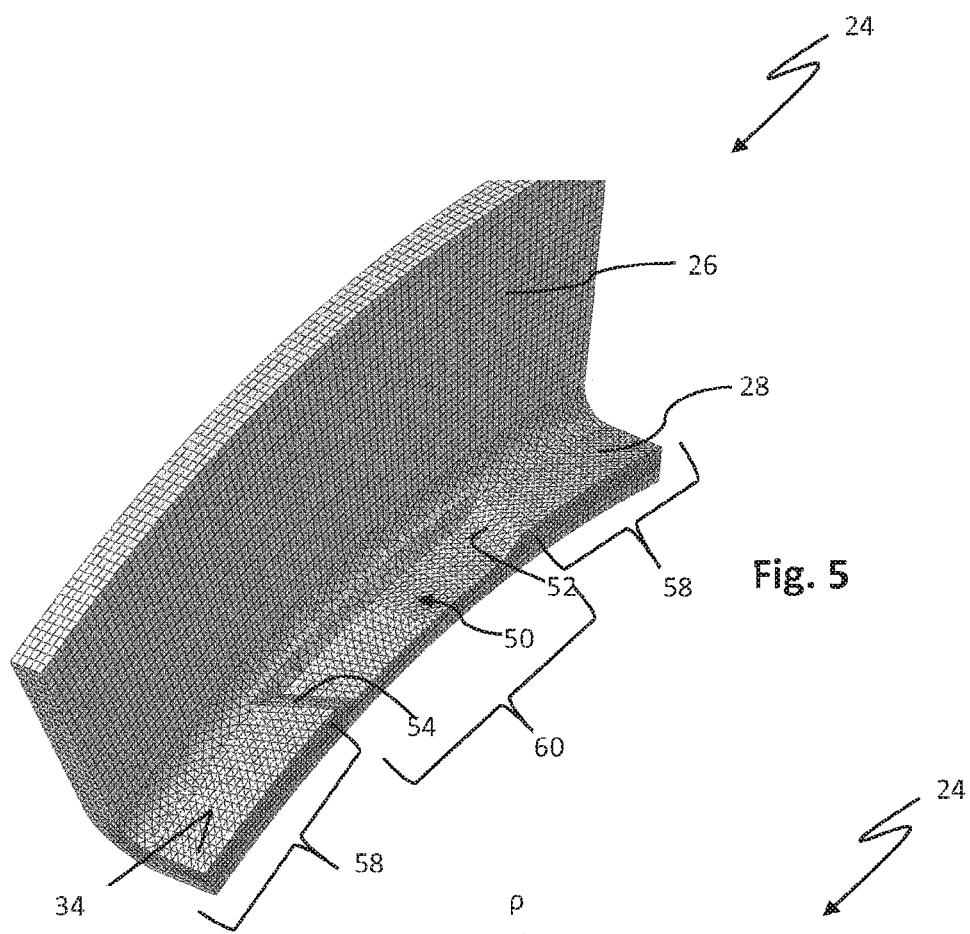
FIG. 5 shows a software-based calculation model of the rotary seal shown in FIG. 1, generated by a computer, in a perspective view
Figure 6:
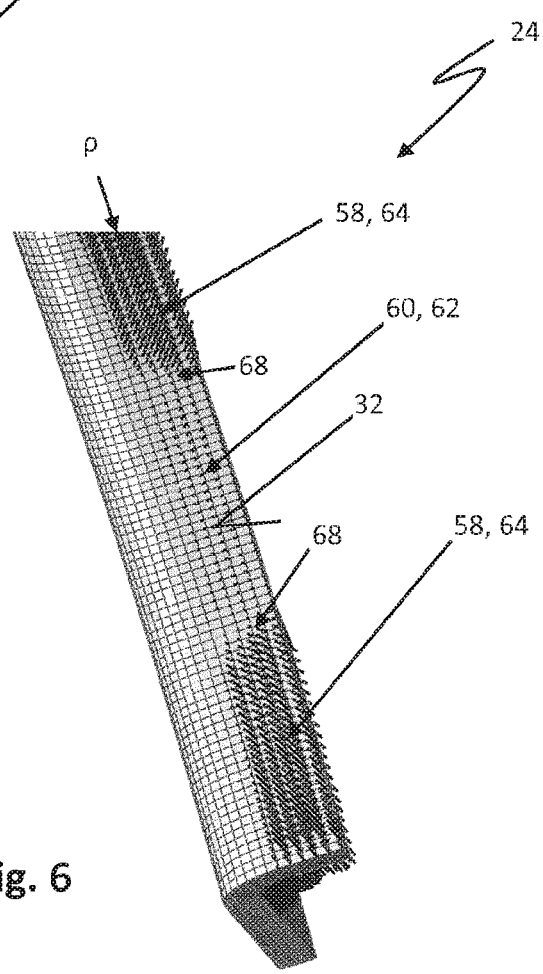
FIG. 6 shows a representation of the calculation model shown in FIG. 5 with graphical representation of the computationally defined contact pressure profile in the region of the sealing lip of the rotary seal when installed in a rotary seal arrangement of FIG. 1, in a perspective view.

FIG. 5 shows a software-generated calculation model of the rotary seal 26 according to FIGS. 1 to 3 with a single rear side pocket 50 on the sealing lip 28 shown in an exposed view. It should be noted that the calculation model also takes into account the other components of the rotary seal arrangement 10 shown in FIG. 1. The calculation model enables the calculation of the contact (surface) pressure, which results in the dynamic sealing surface 22 of the second machine element 14. The result can be seen graphically in FIG. 6. It turns out, as expected, that in the region of the pocket 50, i.e. of the sealing lip region 60 provided with a pocket, the contact pressure ρ of the sealing lip 28 of the rotary seal 24 shown by arrows is smaller (shorter arrows) than in the region between the pockets (longer arrows). It can also be seen that the angles α, β (see FIG. 3) are evident in the pressure distribution.

Figure 7:
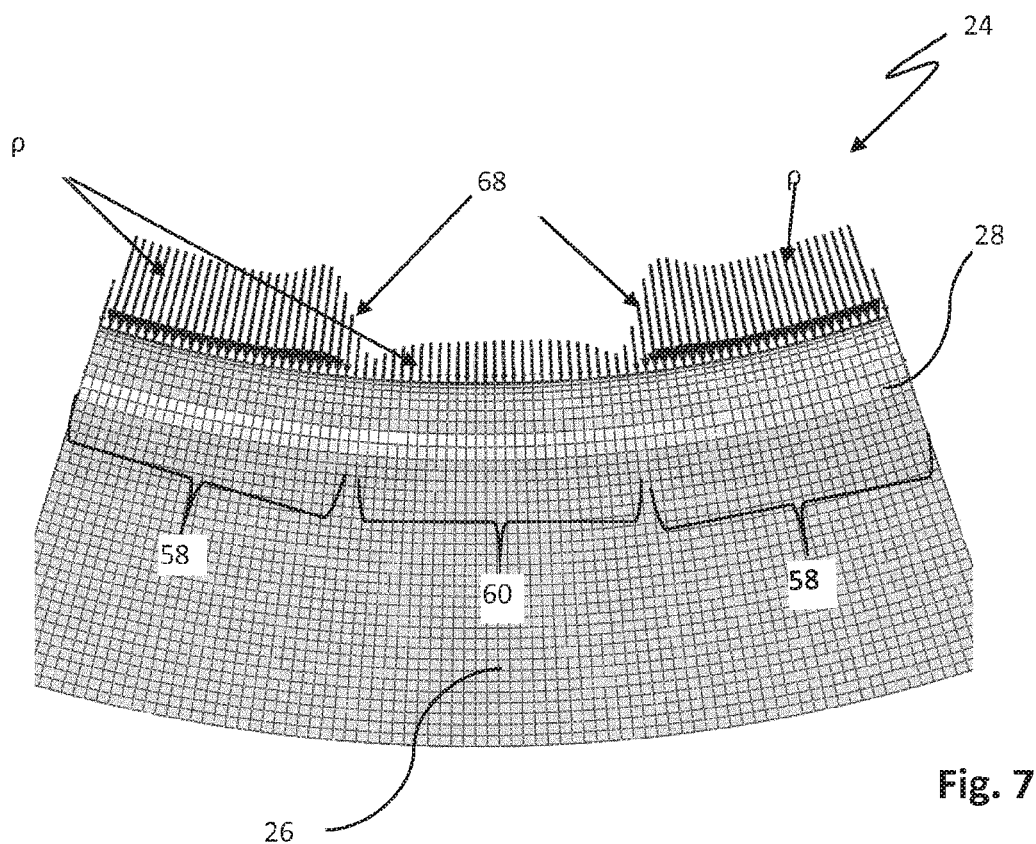
FIG. 7 shows a representation of the calculation model shown in FIG. 5 with graphical representation of the computationally defined contact pressure profile in the region of the sealing lip of the rotary seal when installed in a rotary seal arrangement of FIG. 1, in a side view.

FIG. 7 additionally shows a vectorial representation of the contact pressure ρ between the sealing lip 28 and the sealing surface 22 (see FIG. 1). The variable contact pressure profile in the circumferential direction of the rotary seal 24 with the contact pressure flanks 68 can be clearly seen.

Figures 8A, 8B:
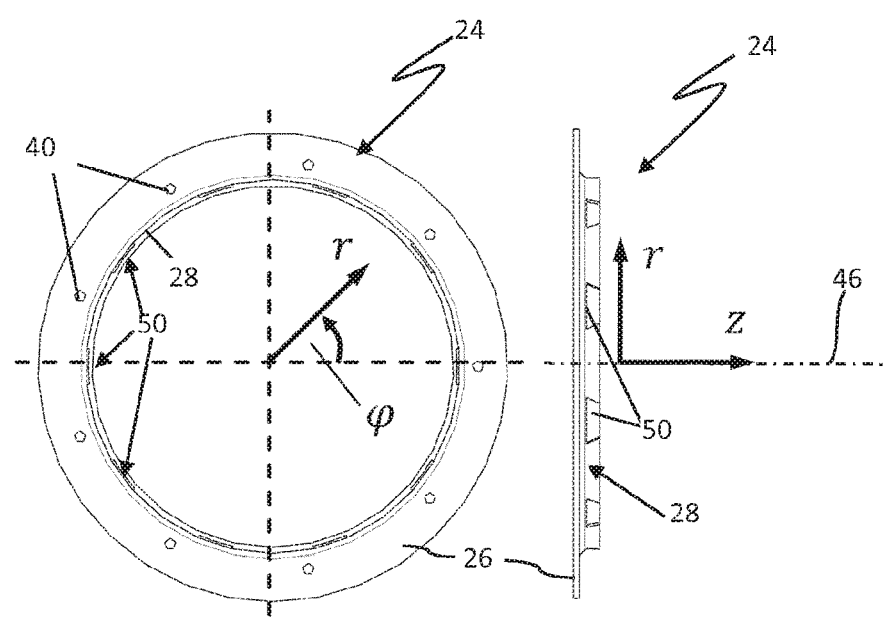
FIG. 8 shows the rotary seal of FIG. 2 in a plan view (FIG. 8A) and in a side view (FIG. 8B) with a cylindrical coordinate system.

The FIG. 8 show the rotary seal 24 in a front view (FIG. 8a) and in a side view (FIG. 8b) together with a cylindrical coordinate system. Z denotes the position on the Z-axis which coincides with the central axis 46 (FIG. 1) of the rotary seal 24. R represents the radial distance from the center. The angle φ denotes the circumferential position around the center.

Figure 9:
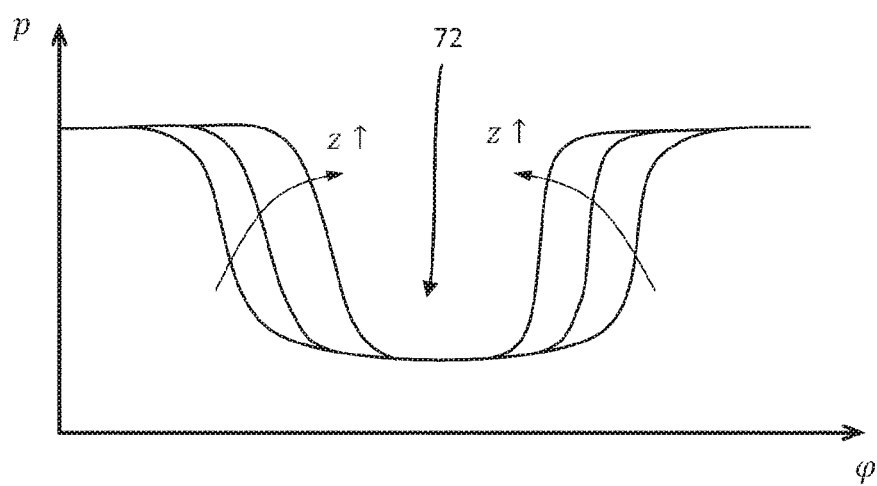
FIG. 9 shows a family of curves showing the spatial profile of the contact pressure in the circumferential direction of the rotary seal along three parallel sections of the sealing lip of the rotary seal, which are shown in FIG. 8B arranged one behind the other in the direction of the Z-axis.

FIG. 9 shows a family of curves with spatially resolved contact pressure curves along three different sections of the rotary seal 24, which are arranged offset in parallel in the Z direction. The three sections thus belong to three different Z coordinates according to the cylindrical coordinate system shown in FIG. 8B. The family of curves is not based here on a mathematical calculation of the contact pressure curves, but is to be understood as a schematic representation. It can be seen that as the Z-coordinate increases (i.e., axially toward the low-pressure side N), the compression valley 72 formed by the pocket 50 becomes narrower. This is due to the fact that with an increasing Z-coordinate, the expansion of the pocket in the φ-direction (and thus in the installed state of the rotary seal 24 towards the low-pressure side N) becomes smaller.

Figure 10:
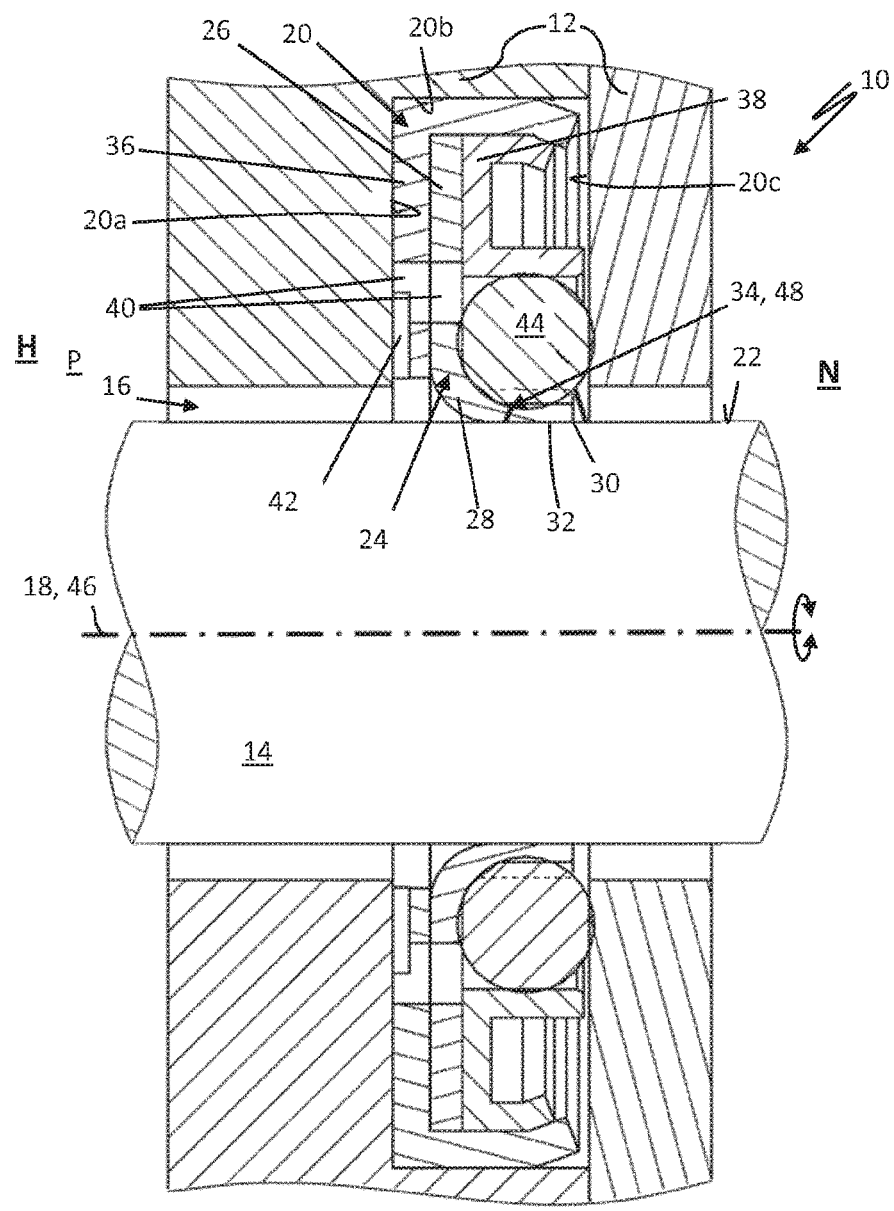
FIG. 10 shows another rotary seal arrangement in which the elastically deformable pretensioning ring of the sealing lip is additionally supported on the outside in the radial direction, to increase the compression of the sealing lip against the sealing surface of the second machine part, in a partial sectional view.

FIG. 10 shows another embodiment of the rotary seal arrangement 10. The elastically pre-formable pretensioning ring 44 is directly supported here in the radial direction on the outside on a support structure of the first machine element 12 comprising the seal holding structure, here a modified clamping ring 38. By supporting the pretensioning ring 44, the compression of the sealing lip 28 against the sealing surface 22, i.e. the contact pressure ρ of the sealing lip 28 and the sealing surface 22 can be further increased. Overall, it is possible here to ensure, over an even wider range of applications, that the sealing lip 28 of the rotary seal 24 also has a non-zero contact pressure ρ in the region of the rear pockets 50.

Figure 11:
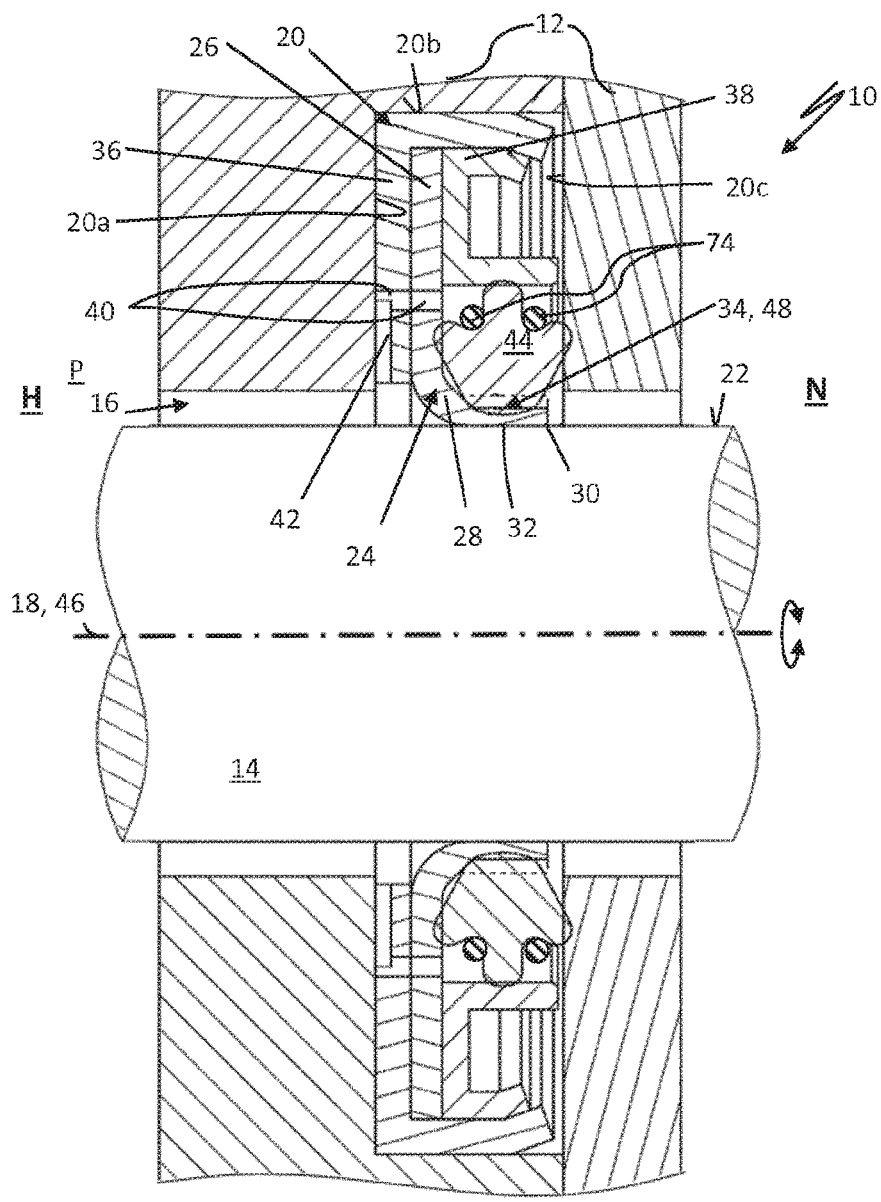
FIG. 11 shows another rotary seal arrangement having a pretensioning ring, which has a cross-sectional shape deviating from a circular cross-sectional shape in a partial sectional view.

According to the rotary seal arrangement 10 shown in FIG. 11, the pretensioning of the sealing lip 28 against the sealing surface 22 can also be increased by one or more string springs or worm spring elements 74, which surround the elastically deformable pretensioning ring 44 radially on the outside. The pretensioning ring 44 need not be an O-ring, in this case, as shown for example in FIG. 10, but may according to FIG. 11 also have another, here lobed, cross-sectional shape, in order to further improve the positional stability of the string spring(s). In this way, moreover, the groove filling of the holding groove 20 of the first machine element 12 serving as a seal-holding structure, for example for the purpose of pressurizing with the operating pressure P, can be reduced.

The rotary seal arrangement 10 may, as explained above, also have a rotary seal 24 in the form of an axial shaft seal dynamically sealing in the axial direction. According to FIG. 12, on the second machine part 14, for example, an annular collar 76, for example in the form of an angled metal sleeve, can be arranged in a rotationally fixed manner, which forms the dynamic sealing surface 22. The annular collar 76 may be, for example, pressed on the second machine element 14 or welded to this or be molded on this. The annular collar 76 rotates here together with the second machine element 14 about the axis of rotation 18. The axial shaft seal may consist of PTFE or a PTFE compound. The pockets 50 arranged on the rear side in the sealing lip 28 are clearly visible. The rear contour of the sealing lip 28 is shown in one of the non-material-weakened circumferential segments of the sealing lip 28 with dashed line 34a.

The first machine element 12 is designed here as a multi-part shaft housing. As with the above-described embodiments of the rotary seal arrangement 10, the elastically deformable pretensioning ring 44, here an O-ring, due to the pockets in the rear side 34 of the sealing lip 28, generates a contact pressure profile of the sealing lip 28 on the sealing surface corresponding to the spatial distribution pattern of the pockets. The fluid entrained by the annular collar 76 experiences a deflection in the positive radial direction as a result of this contact surface pressure distribution. It is thus conveyed back to the sealed high-pressure side H of the sealing gap 16.

Figure 12:
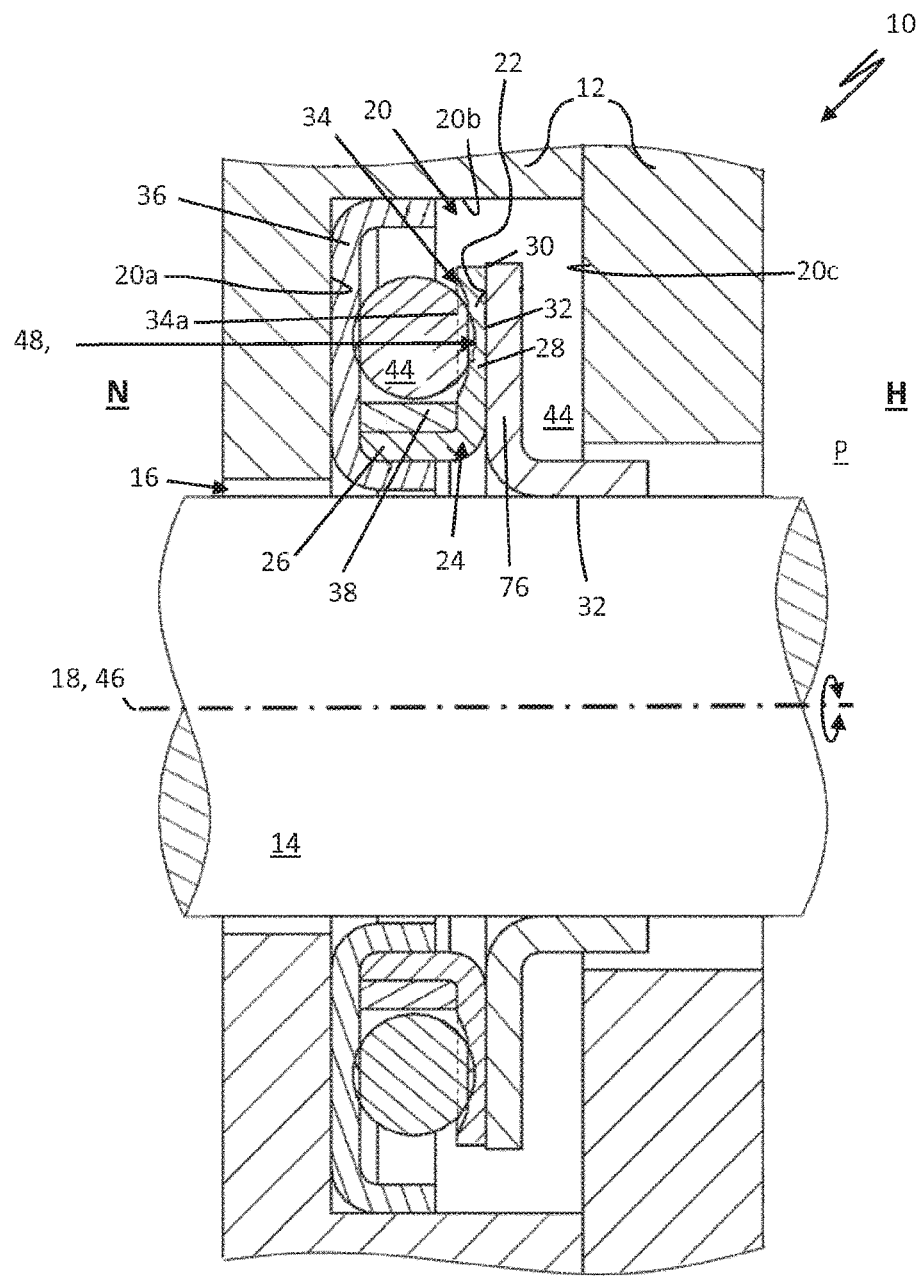
FIG. 12 shows another rotary seal arrangement having a rotary seal sealing in the axial direction, in a partial sectional view.
Figure 13:
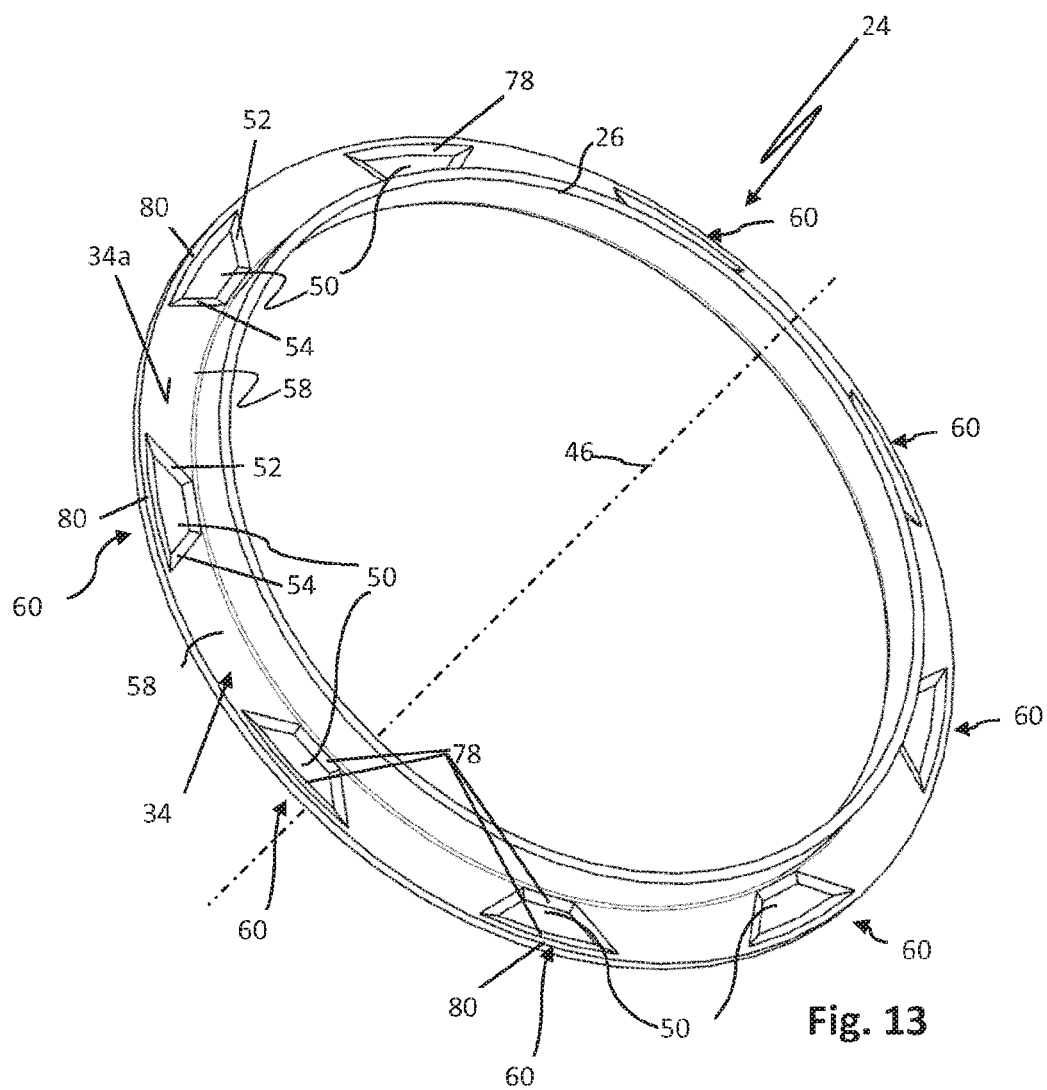
FIG. 13 shows the rotary seal of the rotary seal arrangement shown in FIG. 12, in an exposed perspective view.

FIG. 13 shows the axially sealing rotary seal of FIG. 12 in an exposed view. The pockets 50 in the rear side 34 of the sealing lip 28 are clearly visible. It is also visible in FIG. 13 that the pockets are bounded in the circumferential direction by ramp-shaped or inclined side wall sections 52, 54, relative to the central axis 46 of the rotary seal 24. It is understood that such inclined side wall sections 52, 54 are also possible with the rotary seals 10 explained above in connection with FIGS. 1 to 12. In addition, the pockets are also bounded by a radial direction to the central axis of the rotary seal 24 direction by wall sections 78. These wall sections 78 may in turn also be inclined in a manner corresponding to the side wall sections 52, 54 (to the surface 34a of the rear side 34 of the sealing lip 28). It should be noted that the sealing lip regions 60 provided with pockets 50 of the above-described rotary seals 24 may have a radially outwardly disposed free edge section 80 which is not material-weakened. The elastically deformable pretensioning ring 44 can thereby also be secured in the region of the pockets 50 with respect to a—here radial—slipping from the sealing lip 28.

Figure 14:
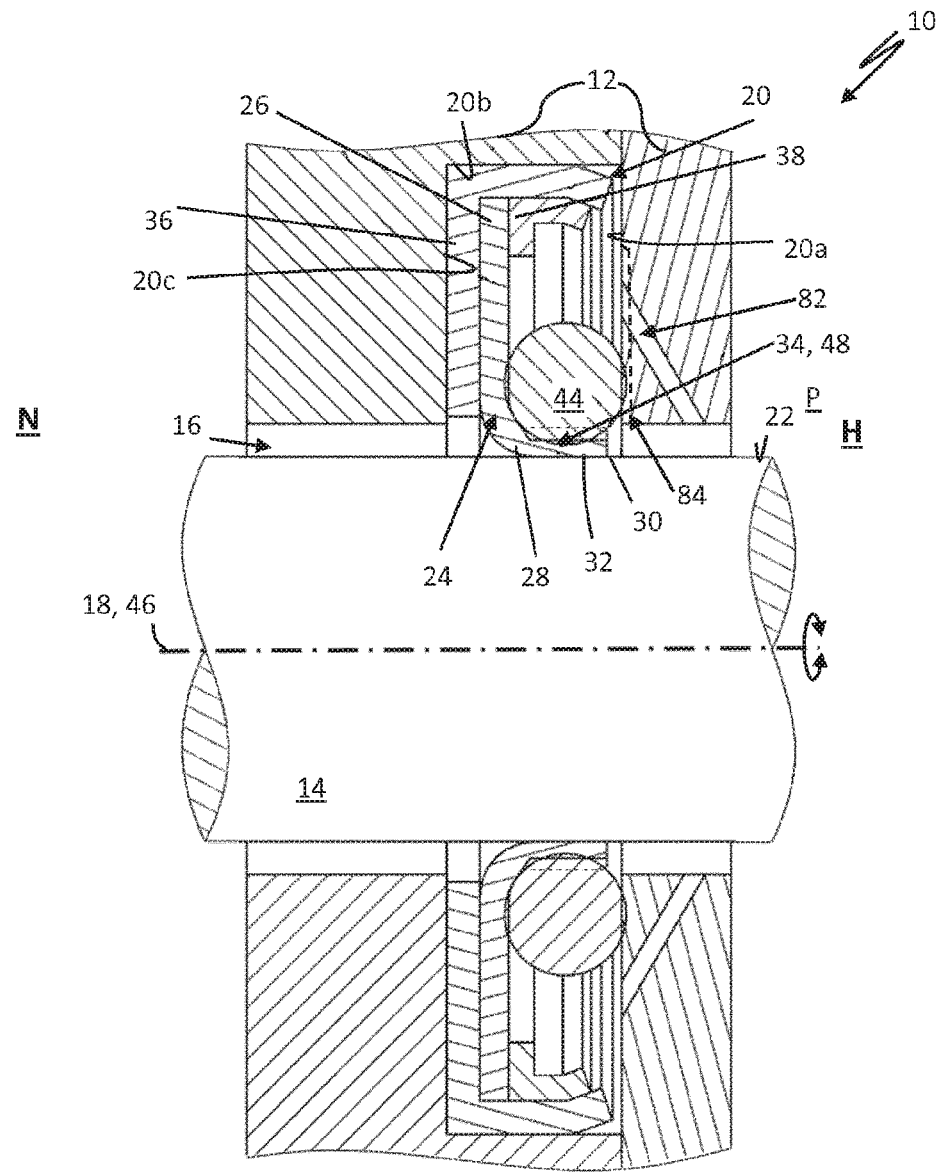
FIG. 14 shows another rotary seal arrangement in which the sealing lip of the rotary seal is additionally pressure-activated, in a partial sectional view.

In principle, the sealing lip 28 of the rotary seal 10 can also extend away from the holding section 26 in the direction of the high-pressure side H of the rotary seal arrangement 10. According to the exemplary embodiment shown in FIG. 14, the first machine element 12 having the holding groove 20 for the additional pressure activation of the rotary seal 24 can comprise a bore 82, through which a fluidic connection of the high-pressure side H to the holding groove 20 is affected.

It is understood that the retaining groove 20 may alternatively or in addition to the bore 82 on its high pressure side groove edge 20a have a groove-shaped flow channel 84 for the fluid arranged on the high pressure side H. This flow channel 84 thus extends radially in the direction of the groove bottom 20b. It should be noted that here, too, the side wall sections (52, 54, cf., FIG. 2) of the pockets 50 arranged on the rear side 34 of the sealing lip 28 diverge in the direction of the high-pressure side H.

Figure 15:
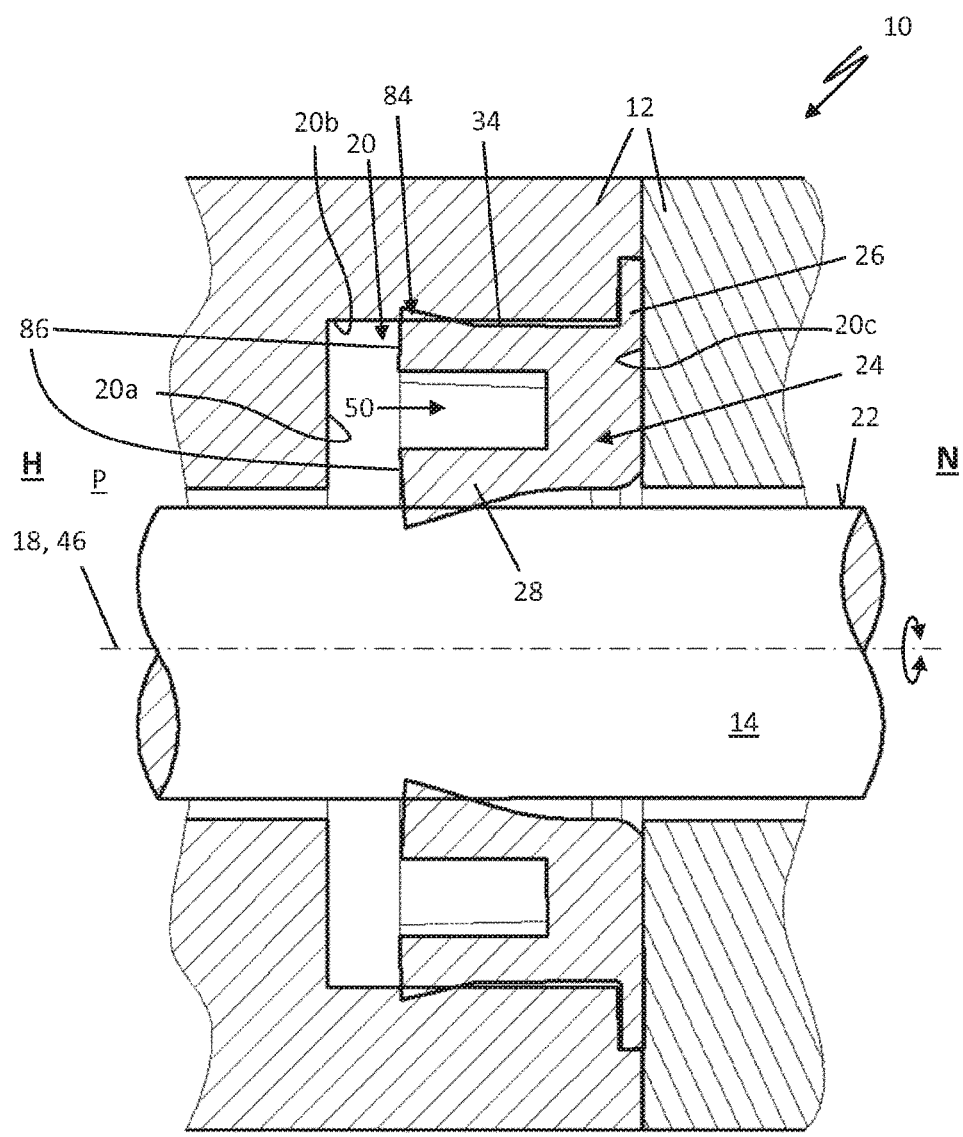
FIG. 15 shows another rotary seal arrangement having a rotary seal which is provided at its end faces with pockets, which are arranged circumferentially spaced apart, wherein the sealing lip is pressure-activated, in a partial sectional view.

FIG. 15 shows a rotary seal arrangement 10, in which the rotary seal 24 abuts sealingly the sealing surface 22 of the second machine element 14 pretensioned without a separately formed pretensioning ring 44. This is due to an elastic resilience inherent in the material of the rotary seal 24. The rotary seal 24 is embodied here by way of example as a radial shaft sealing ring. It is understood that the rotary seal can also be designed as an axial shaft sealing ring. The rotary seal 24 is arranged clamped—here in the radial direction—with its sealing lip 28 between the first machine element 12 and the second machine element 14. The sealing lip abuts the rear side with a statically-sealing sealing section 84 on the first machine element 12, here by way of example the groove bottom 20b of a seal holding structure designed as a holding groove 20, in a statically sealing manner. The dynamic sealing lip 28 of the rotary seal 34 comprises pockets 50 here on its end face 86 pointing to the high-pressure side H. The pockets 50 are also arranged here in the circumferential direction of the rotary seal 34—preferably regularly—spaced from each other. The rotary seal can be pressure-activated by the operating pressure (fluid pressure) P prevailing on the high-pressure side H of the rotary seal arrangement 10.

By the operating pressure P, in the region of the non-material-weakened circumferential segments 58 of the sealing lip, a larger contact surface pressure of the sealing lip 28 is effected against the mating surface, i.e. the sealing surface 22, than in the sealing lip areas provided with pockets.

Figure 16:
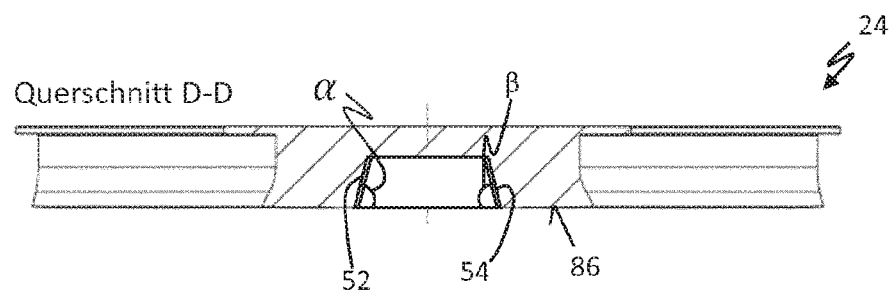
FIG. 16 shows the rotary seal shown in FIG. 15 in an exposed sectional view.

According to FIG. 16, the pockets 50 of the sealing lip 28 taper off from end face 86 with increasing axial depth relative to the center axis 46 of the rotary seal 34 (in the circumferential direction). The side wall portions 52, 54 diverge toward the high pressure side H. Accordingly, the side wall portions 52, 54 of the pockets are here also arranged obliquely to the circumferential direction, at an angle α, β. The principle of fluid recirculation also works here as described above in connection with FIGS. 3 and 4.

Figure 17:
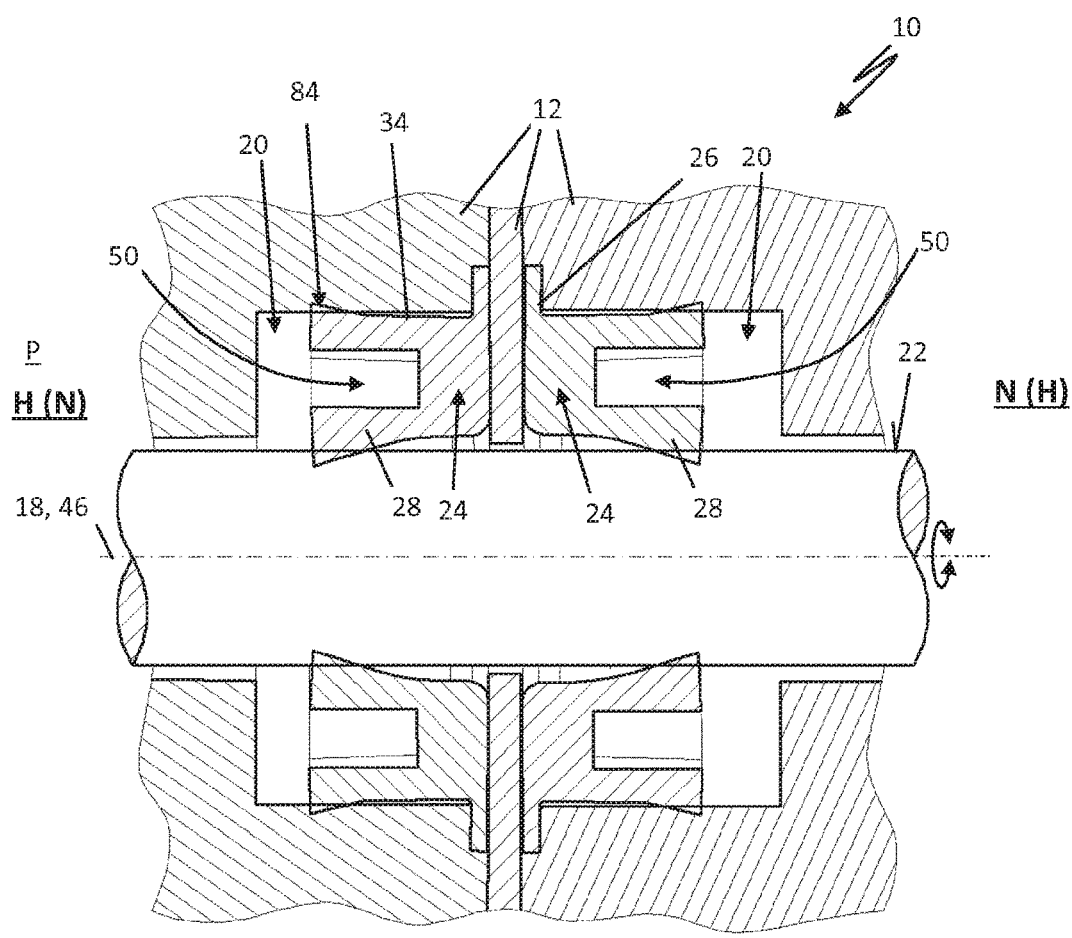
FIG. 17 shows a rotary seal arrangement with two rotary seals, through which a bi-directional recirculation of the fluid with mutual pressurization of the high-pressure side H and the low-pressure side N is affected.

In the structurally simplest case, the rotary seal arrangements 10 have two rotary seals 28 which are arranged one behind the other (along the sealing surface 22). The sealing lips 28 of the two rotary seals 10 can be arranged with end faces pointing to each other, pointing away from each other or aligned with end faces facing the same direction 86. It is essential that the two rotary seals 34 comprise opposite recirculation effects. FIG. 17 shows this by way of example for the embodiment shown in FIGS. 15 and 16. The two rotary seals 23 can be used for the separation of two media spaces, which can be unilaterally, bilaterally or mutually pressure-loaded. According to an embodiment not shown in detail in the drawing, the rotary seal arrangement 10 may also comprise a single rotary seal 24 which acts to separate media. This rotary seal 34 then has two sealing lips 28, which are arranged with end faces facing away from each other.

A rotary seal arrangement 10 with a tandem arrangement of second rotary seals 24, which coincide with each other in their recirculation direction is also conceivable.

Figure 18:
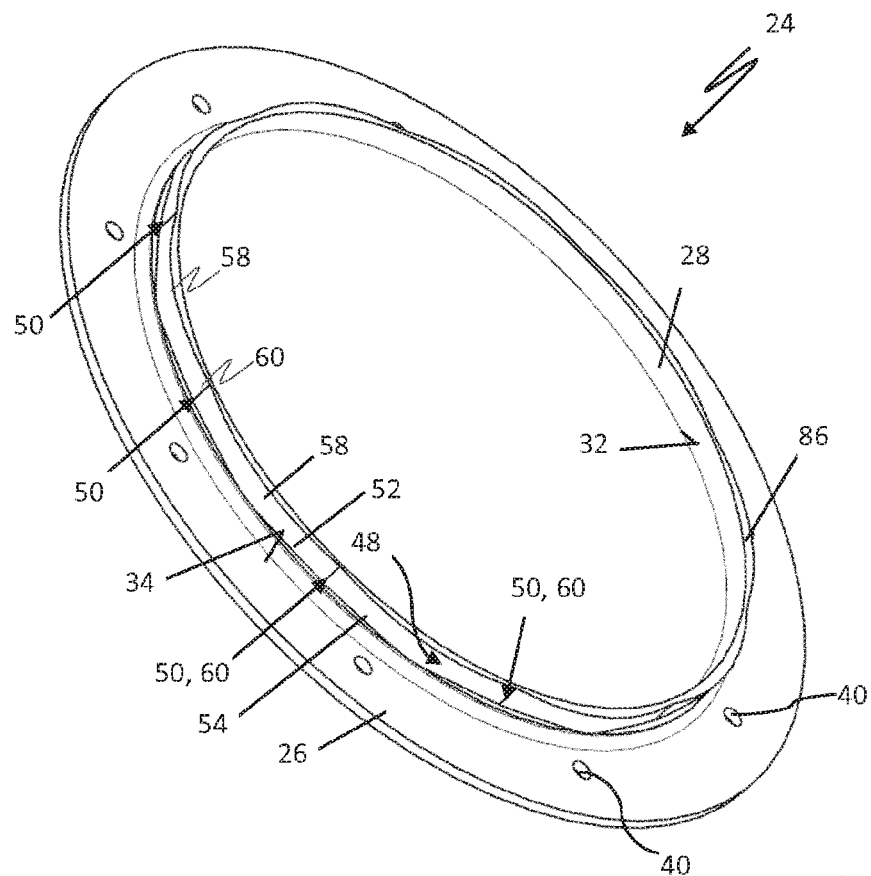
FIG. 18 shows an embodiment of a rotary seal, wherein the surface structuring of the rear side of the sealing lip has a smooth transition between sealing lip regions material-weakened by pockets and non-material-weakened sealing lip regions; in an exposed perspective view.
Figure 19:
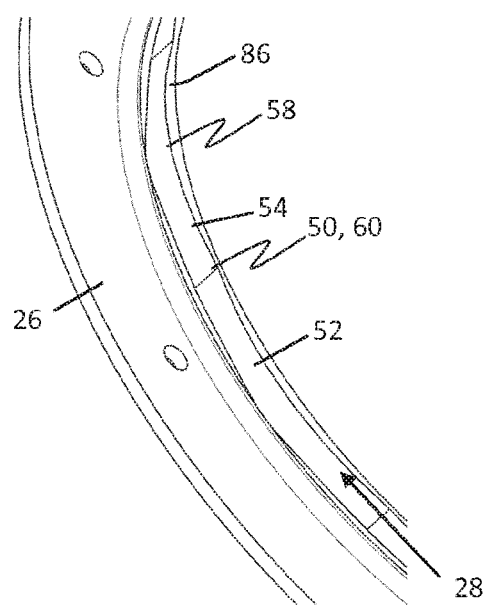
FIG. 19 shows a partially enlarged detail view of the rotary seal according to FIG. 18.
Figures 20A, 20B:
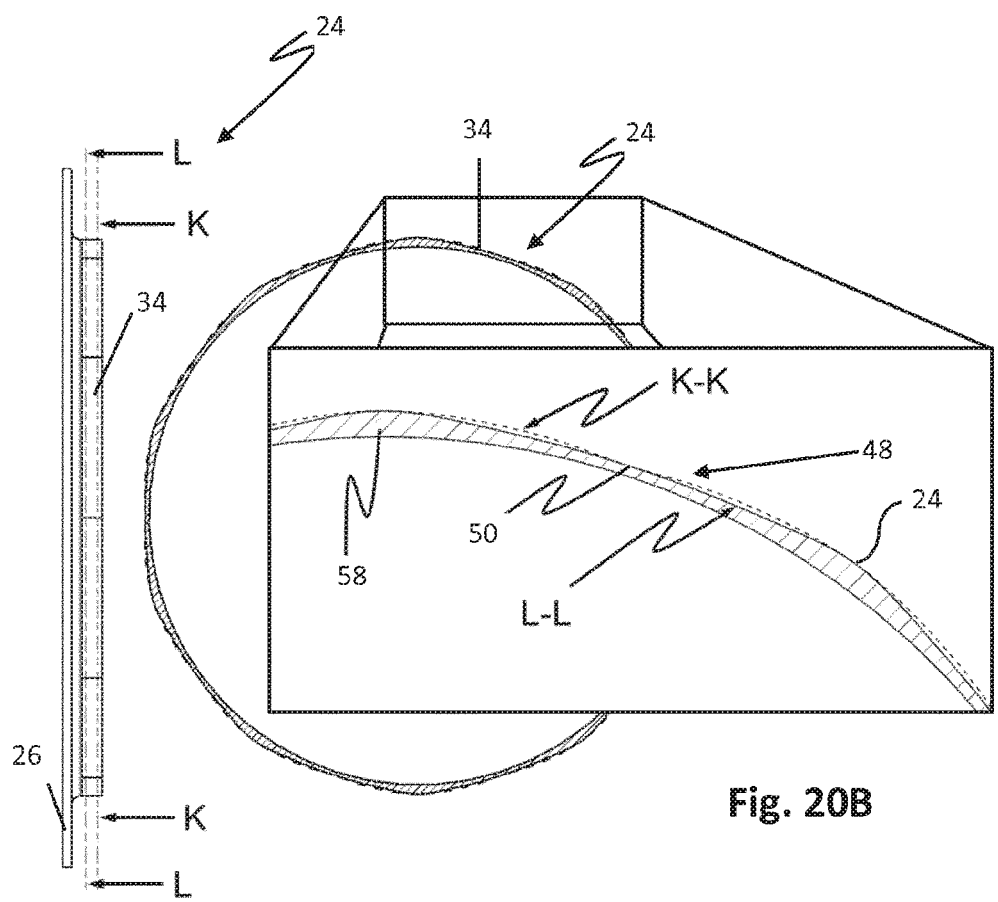
FIG. 20 shows a side view (FIG. 20A) and a detail-enlarged view (FIG. 20B) of the rotary seal shown in FIG. 18.

In the embodiments described above, the pockets 50 of the sealing lip 28 are each bounded by side wall sections 52, 54, which have a sharp-edged transition to the (surface of) the rear side 34 of the sealing lip 28. According to the rotational seal 24 shown in FIGS. 18 to 20, the rear side 34 of the sealing lip 28 may also have a wavy surface contouring. Here, the side wall portions 52, 54 of the pockets 50 and the surface 34a of the rear side 34 of the sealing lip 28 have a smooth transition into each other. To realize the recirculation effect according to the principle shown in FIGS. 3 and 4, it is necessary that the sectional contour of the wavy structured rear side 34 of the sealing lip 28 according to FIG. 3 has the oblique position of the side wall portions 52, 54 marked relative to the circumferential direction of the rotary seal 24 by the angles α, β. The side wall portions 52, 54 of the pockets 50 need not run linearly, but may also be at least partially curved. In the FIG. 20, the change in the sectional contour of the rear side 34 of the sealing lip 28 is illustrated. The two axially offset cross-sections L-L and K-K according to FIG. 20A show different sectional contours (FIG. 20B). The dashed line corresponds to the cross-section K-K, the solid line to the cross-section L-L. The angles α, β and thus the recirculation direction of the rotary seal 24 have the same direction as in the rotary seal 24 according to FIGS. 2 and 3.

Figure 21:
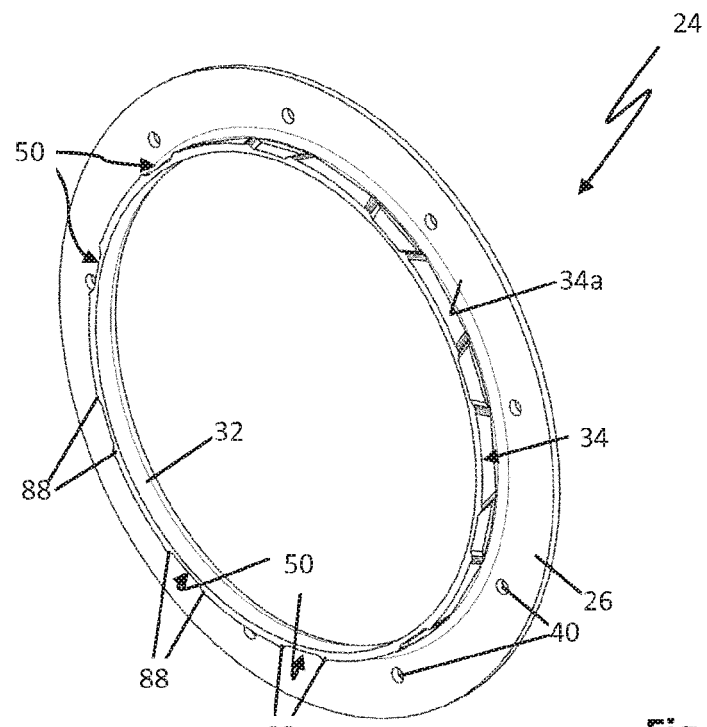
FIG. 21 shows a rotary seal, whose sealing lip has pockets arranged on the rear side and additional elevations, to locally increase the contact pressure of the sealing lip against the dynamic sealing surface on predetermined areas.

For the recirculation function of the rotary seal 24, the sealing lip 28 according to the embodiment shown in FIG. 21, may comprise additional, preferably web or rib-like, elevations 88 on its rear side 34, through which the side wall portions 52, 54 of the pockets 50 of the sealing lip 28 protrude over the contour of the pocket-free circumferential segments 58 of the sealing lip 28. As a result, the contact pressure ρ of the sealing lip 28 in the areas of its front side 32 corresponding to the side wall sections 52, 54 (FIG. 2) can be further increased.

Figure 22:
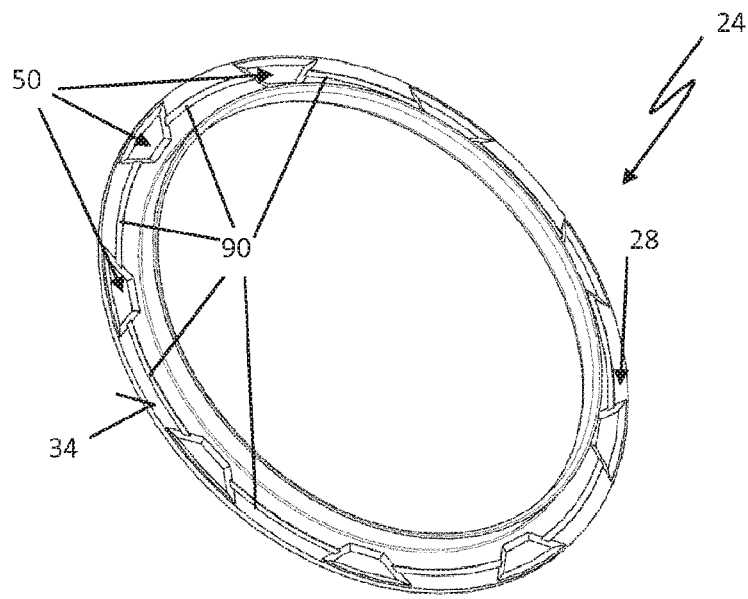
FIG. 22 shows a rotary seal, in which the pockets arranged on the rear side of the sealing lip are interconnected by channels.

FIG. 22 shows a special embodiment of a rotary seal 10—here purely by way of example axially sealing—in which the pockets 50 arranged on the rear side 34 of the sealing lip 28 are additionally fluidly connected to one another via groove-shaped or notched channels 90. In the same way, a radially sealing rotary seal 10, i.e. a radial shaft sealing ring, as shown by way of example in FIG. 2, can be provided with such channels 90.

The surface structuring 48 of the rear side 34 of the sealing lip 28 of the rotary seal required for the recirculation mechanism presented here can be produced by way of various production methods. These include, in particular, embossing processes, laser material processing, machining processes, in particular milling, as well as additive manufacturing processes or also injection-molding processes.

The rotary seals 24 explained above in connection with FIGS. 1 to 22 already have the back surface structuring 48 of the sealing lip 28 in the unassembled state.

What is claimed is:

1. A rotary seal arrangement having a recirculation function, comprising:

a first and a second machine element, spaced apart to form a sealing gap and movable relative to each other about a rotation axis, the first machine element comprising a seal-holding structure and the second machine element comprising a sealing surface;

a rotary seal for sealing a high pressure side H pressurizable with a fluid against a low pressure side N of the sealing gap, the rotary seal being held on the seal-holding structure of the first machine element and having a sealing lip, the front side of which faces the sealing surface and abuts at least in sections in a dynamically sealing manner against the sealing surface of the second machine element;

wherein the sealing lip has pockets on its rear side pointing away from the sealing surface or on its end face facing the high-pressure side H, which are arranged spaced apart both from the rear side and the front side of the sealing lip;

wherein the sealing lip in case of rear side arranged pockets is tensioned against the sealing surface by an elastically deformable pretensioning ring surrounding the sealing lip on its rear side circumferentially, and in case of frontally arranged pockets, by a resilience inherent in the material of the rotary seal;

wherein the sealing in case of rear side arranged pockets, each pocket has a width that extends through the entire width of the rear side surface and the pockets are trapezoidal in shape;

wherein the pockets arranged in the circumferential direction of the rotary seal are spaced apart from each other and laterally limited in the circumferential direction by a side wall portion of the sealing lip, which is arranged relative to the circumferential direction of the sealing lip at least partially under an acute angle a obliquely to the high pressure side H, so that the sealing lip in the circumferential direction of the rotary seal abuts the sealing surface with a contact pressure profile, through which in a relative movement of the two machine parts a recirculation directed to the high pressure side H of fluid passed between the sealing lip and the sealing surface is affected.

2. The rotary seal arrangement according to claim 1, wherein the pockets are laterally limited in the circumferential direction on both sides by a side wall portion of the sealing lip, which side wall portions are, relative to the circumferential direction of the sealing lip, at least partially arranged obliquely at an acute angle α, β and diverge out to the high pressure side H.

3. The rotary seal arrangement according to claim 2, wherein the side wall portions of the pockets are elevated above the contour of the rear side of the sealing lip forming rib-like or web-like elevations.

4. The rotary seal arrangement according to claim 2, wherein the side wall portions of the pockets are connected to the rear side of the sealing lip via an edge or that the side wall portions and the rear side flow smoothly into each other.

5. The rotary seal arrangement according to claim 1, wherein the elastically deformable pretensioning ring over its entire circumference rests on the rear side of the sealing lip, in the region of the pockets of the sealing lip.

6. The rotary seal arrangement according to claim 1, wherein the sealing lip with the frontally arranged pockets statically sealing abuts the first machine part with a statically sealing portion.

7. The rotary seal arrangement according to claim 1, wherein the sealing lip of the rotary seal has a dynamic sealing edge.

8. The rotary seal arrangement according to claim 1, wherein the end-face pockets of the sealing lip of the rotary seal are rectangular or oval in cross-section.

9. The rotary seal arrangement according to claim 1, wherein the rotary seal is dynamically sealing in the axial or in the radial direction with respect to the axis of rotation.

10. The rotary seal arrangement according to claim 9, characterized in that the rotary seal is designed to be dynamically internally sealing or externally sealing in the radial direction.

11. The rotary seal arrangement according to claim 1, wherein the rotary seal consists of a viscoelastically or rubber-elastically deformable material, polytetrafluoroethylene or a polytetrafluoroethylene compound.

12. The rotary seal arrangement according to claim 1, wherein the pretensioning ring is designed as an elastomer or as a rubber ring.

13. The rotary seal arrangement according to claim 1, wherein the rotary seal comprises two sealing lips extending away from the holding section of the rotary seal in opposite directions.

14. The rotary seal arrangement according to claim 1, wherein the rotary seal arrangement comprises a further rotary seal.

15. The rotary seal, being a radial shaft seal, for the rotary seal arrangement according to claim 1, comprising the sealing lip which has the pockets on its rear side or on its end face, which are arranged spaced apart both from the rear side and the front side of the sealing lip, wherein the pockets are arranged spaced apart from each other in the circumferential direction of the rotational seal and, wherein the pockets are laterally limited in the circumferential direction of the rotary seal by the side wall portion of the sealing lip, which at least in sections is arranged obliquely at an acute angle α, β relative to the circumferential direction of the sealing lip.

16. The rotary seal arrangement according to claim 1, including at least one through hole disposed through the rotary seal configured to allow fluidic communication of the fluid on the high pressure side H to exert the same high pressure on the pockets either directly when the pockets are on the end face facing the high-pressure side H or indirectly on the pockets when the pockets are on the rear side pointing away from the sealing surface through the elastically deformable pretensioning ring.

\* \* \* \* \*